Feb. 16, 1937.  R. F. PHILLIPS  2,070,960
JACK
Filed Jan. 11, 1936
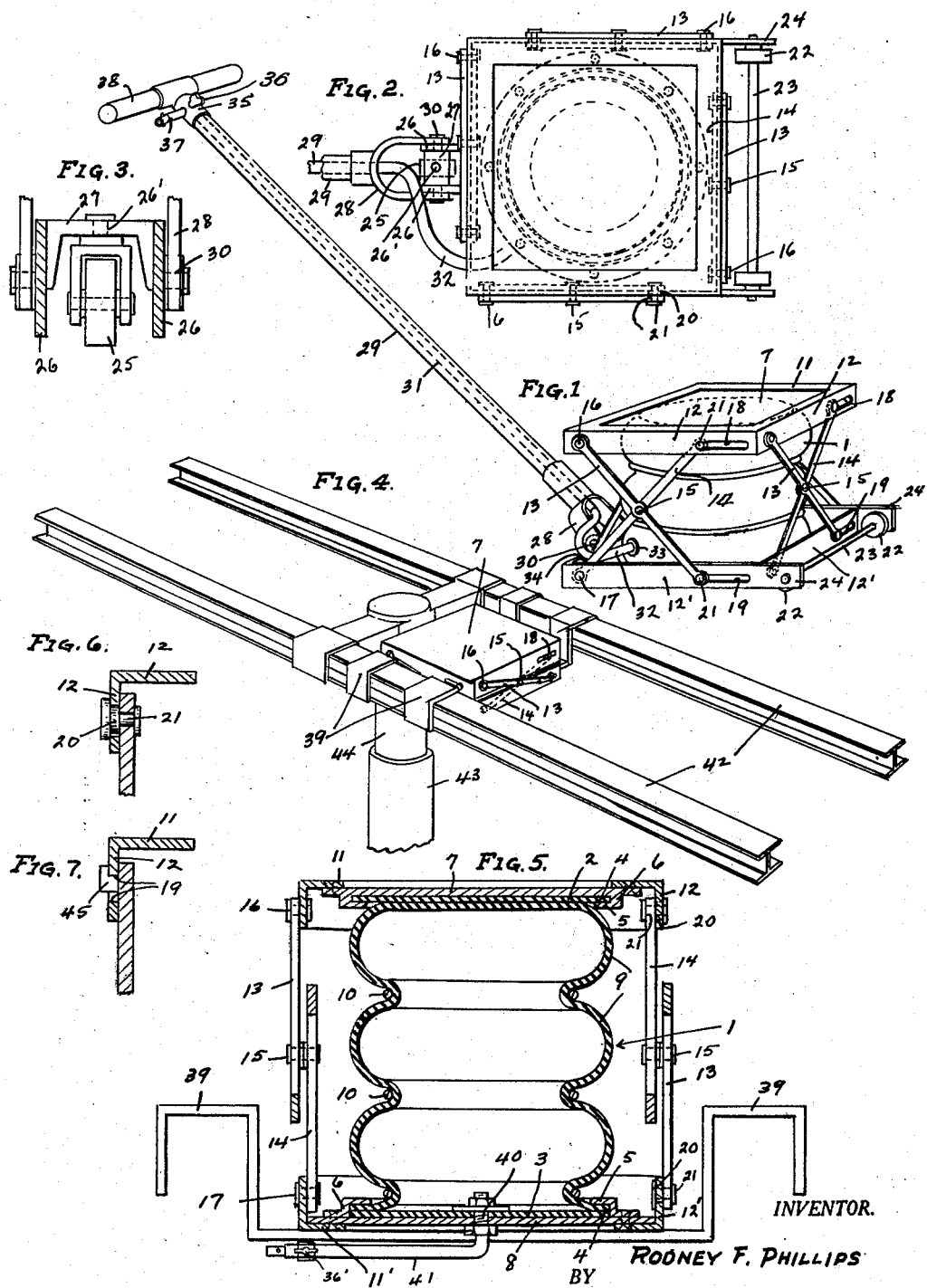
INVENTOR.
RODNEY F. PHILLIPS
BY
Miller Boyken & Bried
ATTORNEY.

Patented Feb. 16, 1937

2,070,960

UNITED STATES PATENT OFFICE 2,070,960

JACK

Rodney F. Phillips, Oakland, Calif.

Application January 11, 1936, Serial No. 58,694

10 Claims. (Cl. 254—93)

This invention relates to fluid hoists or jacks of generally the same type shown in my former United States Letters Patent No. 1,909,890 of May 16, 1933, and has for its objects a small compact, portable fluid jack of relatively great power so as to easily lift an automobile by means of a tire pump or compressed air available in most service stations, and which jack is also adapted for use in combination with the large hydraulic or air hoists in common use in service stations for subsequent lifting of the weight from the springs of an automobile after the automobile has been elevated by the large hydraulic jack. Other objects and improvements will appear in the following specification and drawing.

In the drawing accompanying this application, Fig. 1 is a perspective view of my jack supported on ground wheels and provided with a handle for moving it about.

Fig. 2 is a plan view of the jack when extended with the handle partially broken away.

Fig. 3 is an enlarged elevational view of one of the wheels of the jack with its mounting shown partly in section.

Fig. 4 is a perspective view of my jack in collapsed position in combination with a large hydraulic or air hoist, the cylinder of the large hoist being broken in length.

Fig. 5 is an enlarged sectional view of my jack as shown in Fig. 4 in extended position.

Fig. 6 is an enlarged sectional view of one of the rollers at the ends of the links of my device.

Fig. 7 is a modified form of the construction of Fig. 6 showing a sliding shoe instead of a roller.

Briefly described, my improved jack when collapsed has a height of approximately 5 inches from the floor to the upper surface of the top plate, but extends to a height of approximately 18 inches when fully expanded by introduction of air therein without distortion or canting whereby it may be easily rolled under an automobile of limited road clearance and will readily lift the automobile an ample distance for changing tires or effecting repairs. The jack, with or without the handle attached, is also adapted for being adjustably supplied between the rails of a large hydraulic jack for lifting the body of an automobile placed on the large jack to spread the springs for greasing them, and due to its greatly reduced height when collapsed there is no interference by the body of my jack with the ground or body of the automobile prior to lifting the weight of the automobile body off the springs.

In the drawing my improved jack comprises an expansible bellows 1 of rubber with cords or fabric imbedded therein for strength. The bellows is closed at its lower end by a circular rubber sheet 3 vulcanized across the lower end of the bellows and at its upper end by a head having a sheet 2 vulcanized thereacross, said sheets 2, 3 projecting at their edges 4 laterally for engagement under the circular flanges 5 of rings 6 secured to sheet metal rectangular top and bottom plates 7, 8 respectively.

The main body of the bellows between the top and bottom plates is of unitary construction and is made up of several folds 9 of hemispherical cross section and loose rings 10 are fitted outside the bellows in the small diameter of the bellows between adjacent folds 9.

The top and bottom rings 6 are secured around their outer margins by rivets, or otherwise to inwardly extending sides 11, 11' of opposed rectangular frames of angle iron, the other sides 12, 12' of the frames extending vertically toward each other.

The top and bottom angle iron frames supporting the top and bottom plates 7, 8 are connected by a pair of links 13, 14 generally centrally connected by pivots 15. As shown in the drawing, the link 13 is pivoted at one end adjacent a corner of the upper angle iron frame to the outer side of depending side 12 of the angle iron by a pivot 16 and link 14 is pivoted at the corner of the lower angle iron frame opposed to pivot 16 on the inner side of the upstanding flange or side 12' of the lower frame by a pivot 17. The opposite ends of the links are slidable in horizontal slots 18, 19 in the sides 12, 12' respectively. Similar pairs of links connect the other three sides of the top and bottom frames, the fixed pivots 16, 17 are at the corners adjacent the slots 18, 19 as best seen in Figs. 1 and 2. The ends of the links that slidably engage the slots are preferably provided with rollers 20 on pins 21 that extend through the slots.

The jack of Figs. 1 and 2 has ground rollers or wheels 22 on axle 23 that extends through horizontal extensions 24 of two of the sides of the lower angle iron frame at the forward side of the lower frame and a rear ground wheel or caster 25 is supported between lugs or projections 26 secured centrally on the rear side of the lower frame said caster being mounted on a vertical pivot 26' on a cross member 27 for revolving horizontally around the pivot 26' to enable rolling the jack in any desired direction.

A yoke 28 from which a hollow handle 29 extends is pivotally secured to projections 26 at 30. Extending through the hollow handle is an air line 31 that connects at its lower end to one end of a flexible hose 32, which hose is secured at its opposite end to the lower fold of the bellows by connection 33 for injecting air or fluid into the bellows. This hose extends across one corner of the lower angle iron frame, the side 12 being cut out at 34 to pass the hose.

At the upper end of handle 29 is a valve 35 with a cock 36 and a hose connection 37 for admitting air to the bellows when the connection 37 is connected to an air pressure line, and a cross handle 38 is provided at the upper end of handle 29 for ease in moving the jack.

The air inlet and exhaust, instead of extending through one of the folds of the bellows as seen in Figs. 1 and 2, may extend through the bottom of the bellows as at 40 (Fig. 5) and have an extension 41 formed at its outer end for an ordinary quick detachable coupling on an air pressure line.

Brackets 39 (Figs. 4 and 5) are provided for engaging over the elongated T rails or bars 42 of a hydraulic lift 43 for supporting the jack between the rails as seen in Fig. 4. These brackets are slidable longitudinally of the rails and removable therefrom for placing on either side of the central post 44 of the large hydraulic lift as desired.

The wheels 22, 25 and handle 29 of the lift of Figs. 1 and 2 need not be included in the combination of Figs. 4 and 5, and the hose connection 41 of Fig. 5 may be used on the device of Figs. 1 and 2 without modifying the result obtained, the connection direct to the bellows being merely one form of connection where it is desirable to make the connection above the base instead of below it.

Heretofore it has been necessary to support the automobile on its wheels when the automobile is elevated on the large hydraulic jacks in order to raise the body relative to the running gear to expand the springs, due to insufficient clearance between the jack and body. However, with my device the jack is adapted to fit between the supporting bars of the large hydraulic jack with its upper side substantially flush with the top surface of the bars and my jack can be slid along the bars to any desired point adjacent the central post of the large hydraulic jack, or from end to end of such supply bars where they are mounted at their ends for elevation, as in some types of large jack. The bars 42 shown in Fig. 4 are of the type adapted to engage across the axles of the automobile, and consequently the transmission and lower parts of the automobile are substantially even with the upper surface of the bars.

The bellows of my device during its construction is preferably cured or vulcanized in collapsed form in order to insure rapid collapsing of the bellows upon the air being exhausted and valve 36 (Fig. 1) or 36' (Fig. 5) is adapted to be turned to close or open the air line of the bellows for filling and exhausting the bellows and for maintaining the bellows expanded under pressure.

It is of course manifest that the rollers 20 (Fig. 6) adapted to run in slots 19 may be substituted by sliding shoes 45 as illustrated in Fig. 7 if desired without involving invention.

The top and bottom frames that are connected by the links 13, 14 need not be exactly rectangular, but the opposed sides 12, 12' must be parallel and straight along the portion in which the rollers 20 or shoes 45 are adapted to move.

Having described my invention, I claim:

1. A jack comprising a vertically extensible flexible bellows device, a base member and a top member at the bottom and top of the bellows, two pairs of links the links of each pair being pivotally connected together at a point intermediate their opposite ends, said pairs of links being disposed at substantially diametrically opposite sides of said bellows device when the same is in collapsed position, one of the links of each pair being pivotally connected at one end thereof to the top member and the other link of each pair being pivotally connected to the bottom member and separate substantially horizontally extending guide means formed on the base and top members mounting the opposite ends of the links respectively of each pair for horizontal movement relative to the members upon fluid being admitted to the bellows and exhausted therefrom and subsequently to vertical extension and contraction of the bellows and means for admitting fluid under pressure to said bellows.

2. In a construction as defined in claim 1, said top and bottom members being opposed substantially horizontal plates respectively provided with vertically disposed flanges along opposite edges thereof disposed on opposite sides of the bellows device, said flanges on the plates projecting toward each other, one of the links of each pair of links being pivotally connected at one end to the flange of one plate and the other link of the pair being pivotally connected at one end to the flange of the other plate.

3. In a construction as defined in claim 1, said top and bottom members being opposed substantially horizontal plates, and the said guide means including flanges along the edges of said plates respectively, said flanges extending toward each other at substantially right angles to the planes of the plates.

4. A jack comprising a vertically extensible bellows device, a rigid base member and a top member at the bottom and top of the bellows device respectively, a pair of pivotally connected links at opposite sides of the bellows device connecting the base and top member arranged for permitting movement of the base and top member away from each other upon admission of fluid under pressure to the bellows device, an elongated rigid, tubular handle pivotally secured at one end to said base member and projecting therefrom for moving the jack about and means for admitting fluid under pressure to said bellows device comprising a fluid line connecting with the bellows device at one end and extending longitudinally of the handle through the bore of the handle to adjacent the outer end thereof and a valve on said line rigidly secured to the outer end of the handle for opening and closing said fluid line and the portion of the fluid line between the handle and bellows being flexible.

5. In a jack of the character described, a vertically extensible bellows device provided with an outwardly projecting flange adjacent the upper end thereof integral with the bellows device, a base and top plate at the upper and lower ends of the bellows device a ring adapted to encircle the bellows device at its upper end provided with an inwardly projecting flange adapted to engage over said outwardly projecting flange of the bellows and said ring being secured to the top plate, outwardly of its flange, means for securing the lower end of the bellows to the base plate, pivotally connected link connecting the top and bottom plate for movement away from each other upon admission of fluid under pressure to said bellows, and means for admitting air under pressure to the bellows.

6. In a construction as defined in claim 5, the lower end of said bellows device being provided with an outwardly projecting flange and the means for securing the lower end of the bellows device to the base plate comprising a ring adapted to encircle the bellows device at its lower end provided with an inwardly projecting flange adapted to engage over said outwardly projecting flange at the lower end of the bellows device, said ring being secured to the base plate outwardly of the inwardly projecting flange thereof.

7. A jack comprising top and bottom plates, a bellows positioned between said plates, four pairs of rigid links connecting said plates for movement of the plates toward and away from each other arranged with one pair of said links being positioned at each of the four lateral sides of the bellows and the pairs being substantially equidistant from each other around the bellows, one of the links of each pair being pivotally connected at one end to the top plate and the other link of each pair being pivotally connected at one end to the bottom plate and the opposite ends of said links respectively being connected to the bottom and top plates for horizontal sliding movement, means pivotally connecting the links of each pair together at a point intermediate their opposite ends, and means for admitting fluid under pressure to within said bellows for extending the same.

8. In a construction as defined in claim 7, said top and bottom plates including flanges around the edges thereof, said flanges projecting generally vertically toward each other from the respective plates and being of a width to coact for substantially enclosing the sides of the bellows when the latter is in collapsed position.

9. In a construction as defined in claim 7, said top and bottom plates being substantially rectangular in shape and including flanges along the four edges thereof respectively, said flanges extending toward each other from the plates and the pivotal and sliding connections between said plates and links being disposed on the flanges, one of the links of each pair being positioned adjacent the bellows and inwardly of the flange to which it is connected and the other link of each pair being positioned outwardly of the flange on the side thereof remote from the bellows.

10. In combination with a fluid operated jack having a pair of spaced horizontally elongated similar rails extending side by side, an upper and a lower plate positioned between said rails arranged for vertical movement of the upper plate relative to the lower plate, means supporting said lower plate rigidly from the rails, a vertically extensible pneumatically actuated bellows positioned between said plates and connected top and bottom with the upper and lower plate respectively, the assembly of the plates and bellows being of a vertical overall dimension relative to the vertical thickness of the rails and positioned in a manner whereby the major portion of the assembly is disposed within the horizontally projected area extending between the adjacent sides of the rails of a vertical maximum depth not greater than the maximum vertical dimension of the rails respectively.

RODNEY F. PHILLIPS.